United States Patent [19]

Rees

[11] 4,438,895
[45] Mar. 27, 1984

[54] VERTICAL SEAT ADJUSTER FOR VEHICLE SEATS

[75] Inventor: Richard W. A. Rees, West Bloomfield, Mich.

[73] Assignee: General Motors Corporation, Detroit, Mich.

[21] Appl. No.: 383,471

[22] Filed: Jun. 1, 1982

[51] Int. Cl.³ .......................................... F16M 11/24
[52] U.S. Cl. .................................... 248/396; 297/325
[58] Field of Search ............... 248/394, 396, 397, 419; 297/325; 403/93, 98

[56] References Cited

U.S. PATENT DOCUMENTS

| | | | |
|---|---|---|---|
| 2,609,029 | 9/1952 | Haberstump | 155/14 |
| 3,460,793 | 8/1969 | Posh | 248/394 |
| 3,692,271 | 9/1972 | Homier et al. | 248/396 X |
| 4,190,225 | 2/1980 | Bauer et al. | 248/394 |
| 4,247,071 | 1/1981 | Carella et al. | 248/396 |

FOREIGN PATENT DOCUMENTS

| | | | |
|---|---|---|---|
| 2409579 | 9/1975 | Fed. Rep. of Germany | 248/396 |
| 649595 | 11/1962 | Italy | 248/396 |
| 1049792 | 11/1966 | United Kingdom | |
| 1493438 | 11/1977 | United Kingdom | |

Primary Examiner—J. Franklin Foss
Assistant Examiner—David L. Talbott
Attorney, Agent, or Firm—Herbert Furman

[57] ABSTRACT

A vertical seat adjuster for vehicle seats includes a seat support bracket fixed to the seat and having front and rear arcuate slots. Front and rear levers are pivotally mounted on the vehicle and pivotally secured to the seat support bracket. The pivotal mountings of the levers are received through the slots of the bracket. A lock plate for each lever is slidably mounted on the bracket for movement between an engaged position wherein it engages the pivot means projecting through the slot of the seat support bracket to lock the bracket in a vertical adjusted position, and a released position, wherein the bracket is movable relative to the pivot means upon rotation of the lever thereabout. A manually operable release mechanism selectively and alternately moves the lock plates to released position and such plates are biased to engaged position.

5 Claims, 8 Drawing Figures

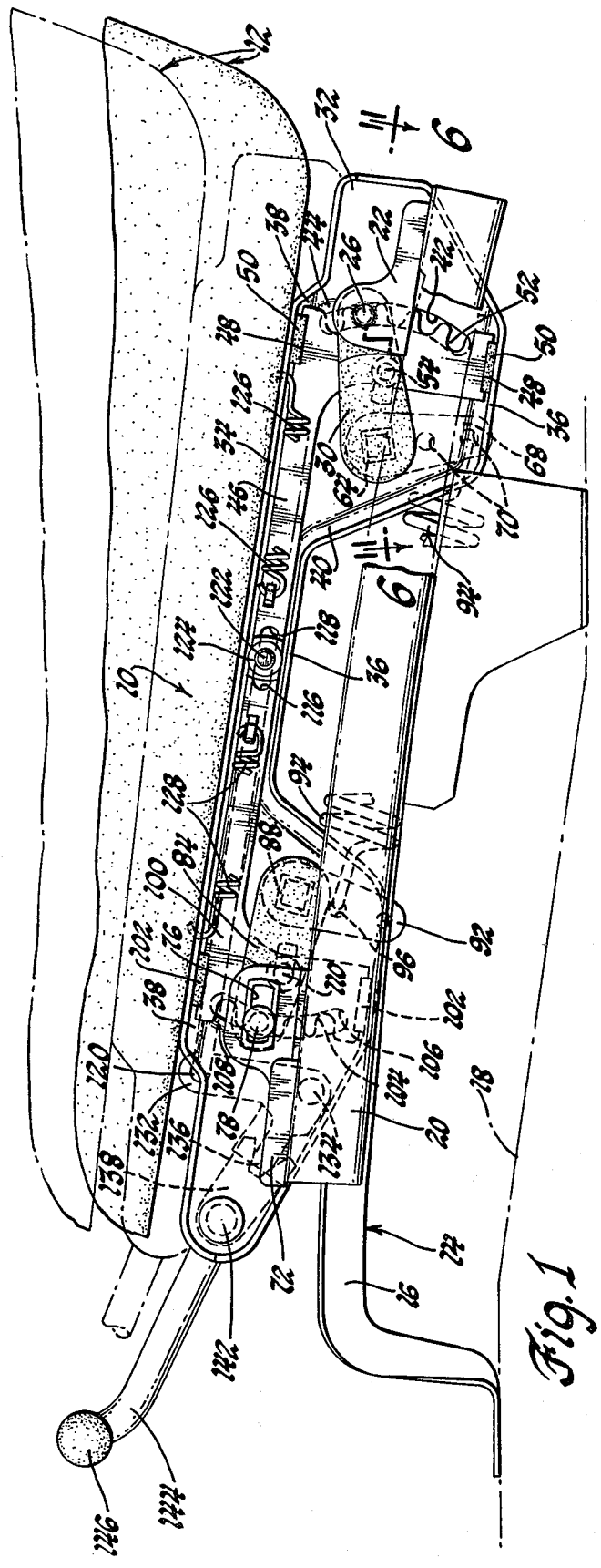

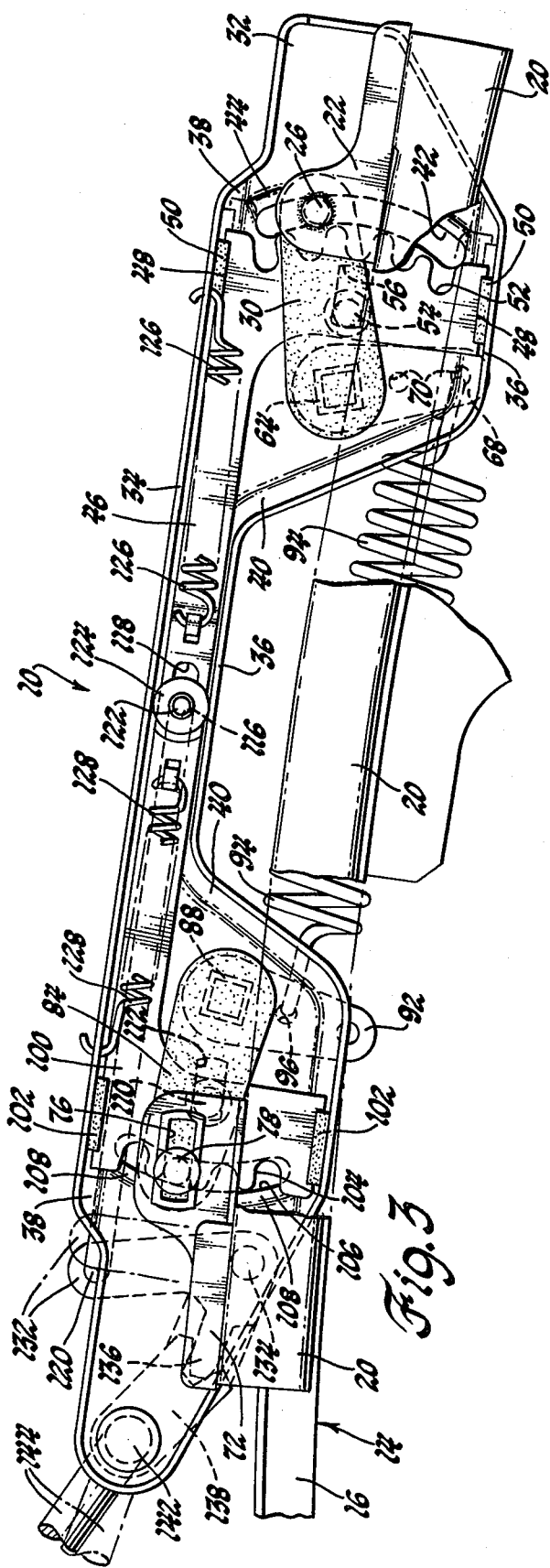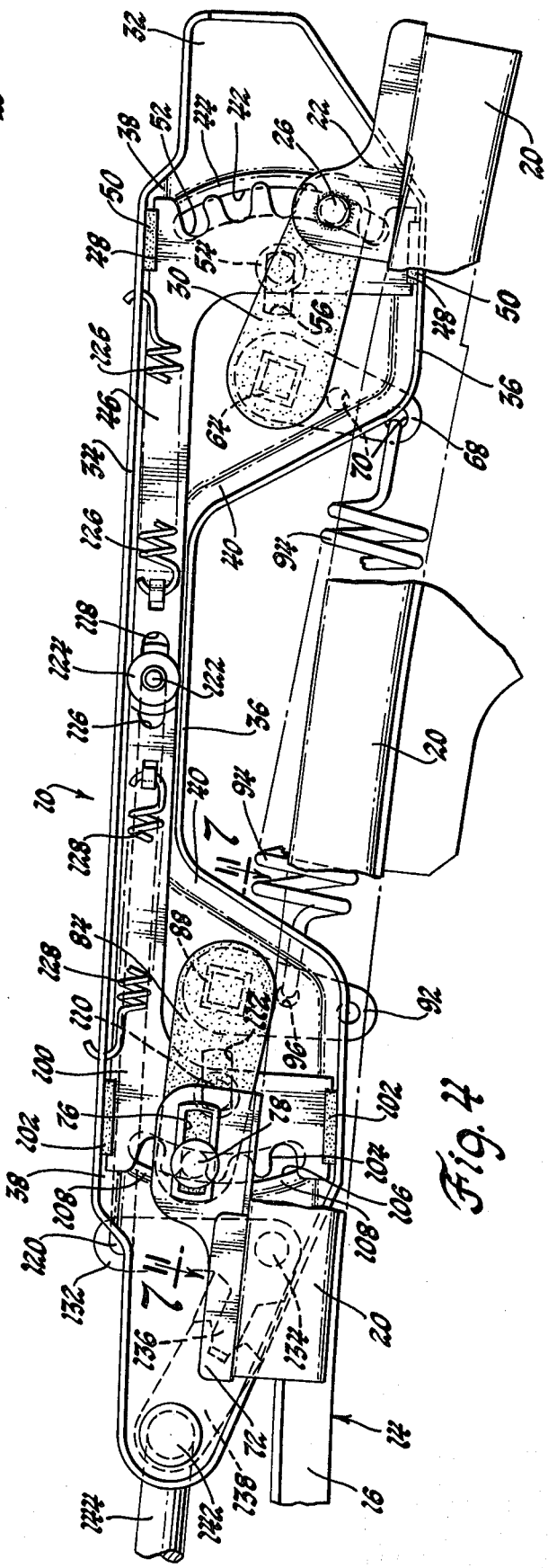

VERTICAL SEAT ADJUSTER FOR VEHICLE SEATS

This invention relates generally to vertical seat adjusters for vehicle seats and more particularly to such an adjuster for selectively and alternately manually adjusting the front and rear portions of the seat.

BACKGROUND OF THE INVENTION

Vehicle seat adjusters for manually adjusting vehicle seats are well known.

The seat adjuster of this invention differs from known seat adjusters by obtaining vertical adjustment through spaced front and rear levers having one end thereof rotatably supported on a relatively fixed vehicle pivotal connection and the other end thereof rotatably secured to the seat. Selective and alternate rotation of a lever about its relatively fixed vehicle pivotal connection raises and lowers a respective front or rear portion of the seat. A lock plate respective to each lever is slidably and non-rotatably mounted on the seat and engageable with the vehicle pivotal connection to lock the seat against vertical movement relative to the vehicle and thereby fix the vertical position of the front and rear portions of the seat. The lock plates are normally biased into engagement with a respective vehicle pivotal connection and selectively and alternately movable out of such engagement when vertical seat adjustment is desired.

The primary feature of this invention is that it provides an improved vertical seat adjuster for vehicle seats wherein vertical adjustment is obtained through the rotative movement of levers pivotally connected to the seat and to the vehicle, with the seat being releasably locked in a vertically adjusted position by lock plates which are slidable and non-rotatably mounted to the seat and engage the vehicle pivots of the levers to prevent vertical movement of the seat relative to the vehicle. Another feature is that the pivotal connections of the levers to the vehicle are provided by pin means and that the lock plates are engageable with such pin means to prevent vertical movement of the seat relative to the vehicle. A further feature is that the pivotal connection of the levers to the seat are provided by a seat support bracket which includes slots receiving the pin means, with the lock plates being movable relative to such slots to engage the pin means.

These and other features of the invention will be readily apparent from the following specification and drawings wherein:

FIG. 1 is a side elevational view of a vertical seat adjuster according to this invention;

FIG. 2 is a partially broken-away plan view;

FIG. 3 is an enlarged view of a portion of FIG. 1 with the rear portion of the seat adjuster being vertically adjusted;

FIG. 4 is a view similar to FIG. 3 with the rear portion of the seat adjuster vertically raised from its position of FIG. 1;

Figure 5:
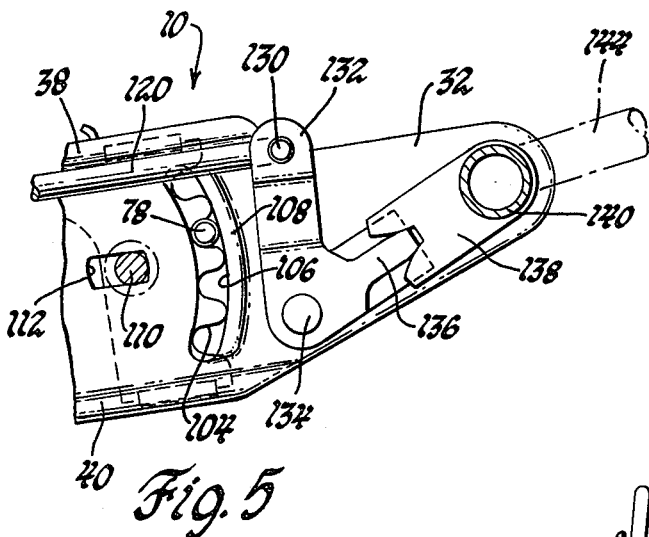
FIG. 5 is a view taken along line 5—5 of FIG. 2.

FIG. 1 shows an outboard left hand vertical seat adjuster according to this invention which is designated generally 10. It will be understood that there is a like opposite right hand inboard seat adjuster, not shown. The outboard adjuster 10 and the inboard adjuster extend longitudinally of the seat 12 under the outboard and inboard edge portions thereof.

A conventional horizontally adjustable seat adjuster 14 is located outboard of adjuster 10 and includes a lower track 16 fixedly mounted on the vehicle floor pan 18 and an upper track 20 horizontally adjustable relative thereto. The details of the horizontal adjuster 14 are not shown since it is conventional and any one of various known horizontal seat adjusters may be used. Reference may be made to Ser. No. 318,133 filed Nov. 4, 1981, James R. Drouillard, Manually Operated Bucket Seat Adjuster, and assigned to the assignee of this invention for such a known seat adjuster.

Figure 6:
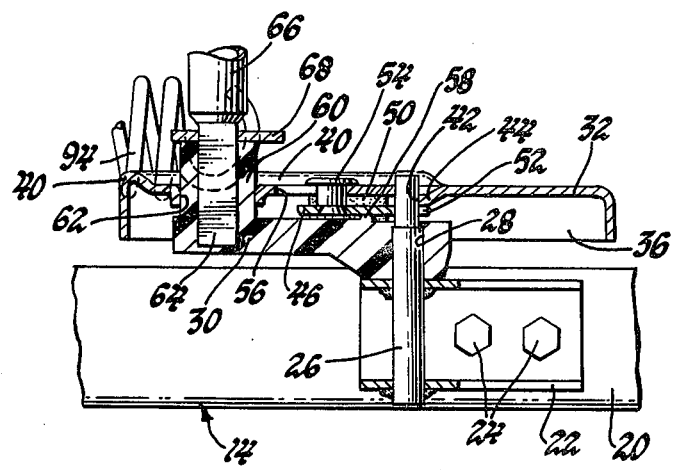
FIG. 6 is an enlarged view taken along line 6—6 of FIG. 1.

A rear support bracket 22 is secured at 24 to the upper track 20 of the adjuster 14. The bracket 22 is of channel shape and includes an aligned pair of upwardly extending apertured ears which receive and are welded to a shouldered pin 26, FIG. 6, which projects inwardly of the inboard ear of the bracket. The pin 26 is received through a shouldered bore 28 in one end of a rear seat support lever 30 of molded plastic to thereby rotatably mount the one end of the lever 30 on the vehicle through the adjuster 14. A seat support bracket 32 extends longitudinally beneath seat 12 and includes a continuous laterally outwardly extending peripheral flange having an upper flange portion 34 which is conventionally secured to the seat 12, FIG. 1, and spaced lower flange portions 36. A linear strengthening bead 38 is provided at the juncture of the bracket 32 and flange portion 34 and a like bead 40 is provided between the juncture of the bracket 32 and the flange portions 36. The bead 40 runs between the flange portions 36. The bracket 32 includes an arcuate closed slot 42, with the portion 44 of bracket 32 adjacent the concave edge of the slot 42 being slightly planar offset outboard of the bracket as shown in FIG. 6. The inner end portion of the pin 26 extending inwardly of the lever 30 extends through and moves within the slot 42 as will be further described.

A rear generally L-shaped lock plate 46 has the base thereof fitting between the flange portion 34 and one flange portion 36. The base of the lock plate is notched at 48, FIG. 1, at its upper and lower edges for receipt of generally U-shaped plastic shoes 50 which bear against flange portion 34 and the one flange portion 36 to slidably and non-rotatably mount the lock plate 46 on the bracket 32. The lock plate 46 includes an arcuate rear edge portion which overlies slot 42 and is provided with a circumferential series of five notches or grooves 52. The pin 26 will always be received in one of the notches 52 to vertically fix the seat 12 as will be described. As best shown in FIG. 6, a headed rivet 54 is fixed to the base of the lock plate 46 and received within an elongated horizontal slot 56 in the bracket 32 to guide horizontal sliding movement of the lock plate relative to the bracket. The lever 30 additionally includes an arcuate rib 58 which bears against the lock plate 46 to hold the lock plate against the bracket 32 but permit sliding movement of the lock plate relative to the bracket.

As shown in FIGS. 2 and 6, the other end of the lever 30 includes an integral tubular extension 60 which extends inboard through an outboard flanged opening 62 in the bracket 32. The extension 60 includes a generally square cross-section bore which receives a like shaped end 64 of a transfer tube 66 which extends transversely underneath the seat 12 and ties the outboard rear seat support lever 30 to the same lever of the inboard seat adjuster. Slot 42 and the rear edge portion of lock plate 46 are generated about the center of opening 62. A counterbalance lever 68 has a square shaped opening in its upper end which is slidably and non-rotatably received on the end 64 of tube 66 to couple the lever to the tube. The lever is provided with a spaced pair of apertures 70 for a purpose to be described.

Figure 7:
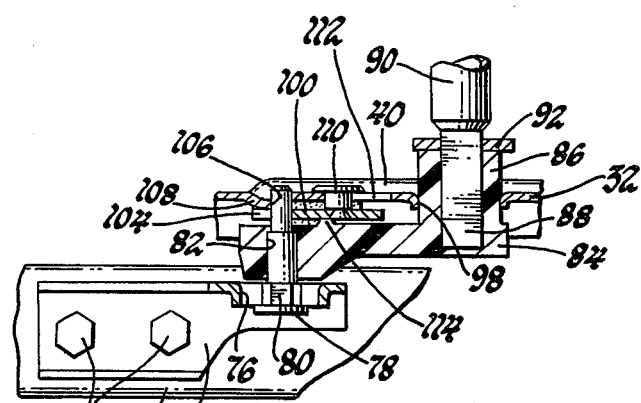
FIG. 7 is a view taken along line 7—7 of FIG. 4.
Figure 8:
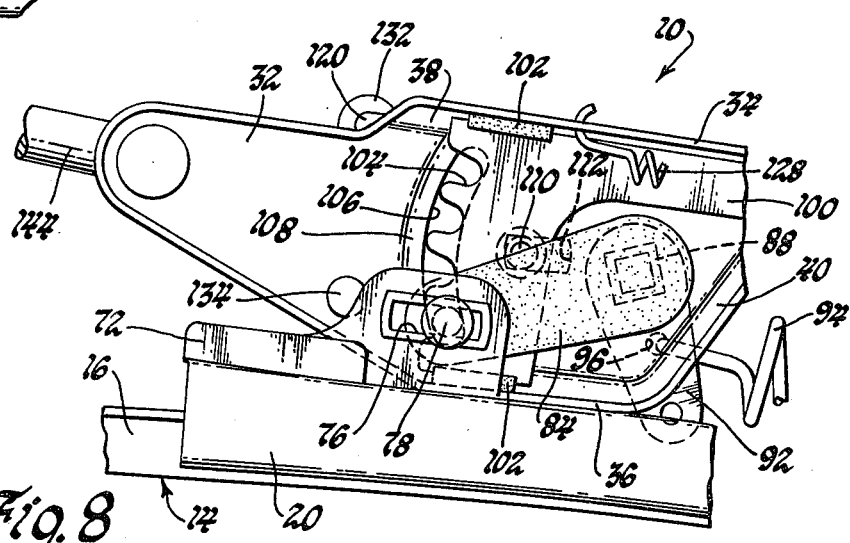
FIG. 8 is an enlarged view of a portion of FIG. 1.

A front support bracket 72, FIGS. 2 and 7, includes a channel shaped forward portion which is secured at 74 to the upper track 20 of the adjuster 14. The inboard leg of this bracket includes an upwardly extending rear ear which is provided with an outboard flanged horizontal slot 76 best shown in FIG. 7. A shouldered pin 78 includes a double D portion 80 which is received within the slot 76 to mount the pin to the bracket 72 for horizontal sliding movement relative thereto. The pin is received through a shouldered bore 82 in one end of a molded plastic front seat support lever 84 which is the same as the rear seat support lever 30. Pin 78 rotatably mounts the lever 84 to the horizontal seat adjuster 14 and to the vehicle. The lever 84 further includes an integral tubular extension 86 which receives the square shaped end 88 of a front transfer tube 90 which is the same as the tube 66. Tube 90 ties the outboard lever 84 to the same lever of the inboard seat adjuster. A front counterbalance lever 92 which is the same as the rear counterbalance lever 68 is slidably and non-rotatably mounted on the end 88 of the tube 90. The counterbalance levers 68 and 92 are interconnected by a coil tension spring 94. It will be noted that the front end of the spring 94 is hooked through the upper of the apertures 96 of the lever 92 and the rear end of the spring is hooked through the lower of the apertures 70 of the lever 68 to thereby provide a greater counterbalance force for raising the rear portion of the seat than raising the front portion of the seat as will be described. The extension 86 of the lever 84 is rotatably received in an outboard flanged opening 98 of the support bracket 32, FIG. 7.

A front lock plate 100 of generally L-shape mounts plastic shoes 102 to the edges of the base thereof in the same manner as the shoes 50 are mounted to the edges of the base of the rear lock plate 46. The base of the lock plate 100 is received between the flange portion 34 and the other flange portion 36 and the shoes 102 slidably and non-rotatably mount the lock plate on these flange portions of the bracket 32. The front lock plate includes a series of four notches or grooves 104 which overlie an arcuate closed slot 106 of bracket 32, with the portion 108 of the bracket to the concave side of the slot being planar offset outboard of the bracket. Slot 106 and portion 108 are the same as slot 42 and portion 44. The inner end of pin 78 projects through the slot 106 and is received in one of the notches 104 to fix the vertical position of the front portion of the seat 12.

A headed rivet 110 is fixed to the lock plate 100 and movable within an elongated horizontal slot 112 of bracket 32 to guide sliding movement of the lock plate 100 relative the bracket 32 between locked and released positions. The lever 84 includes an arcuate rib 114 which holds the lock plate 100 against bracket 32.

As best shown in FIGS. 2 and 4, the rearwardly extending leg of the front lock plate 100 is provided with an elongated slot 116 and the forwardly extending leg of the rear lock plate 46 is slightly offset outboard and provided with a like slot 118 which overlaps the slot 116. An elongated S-shaped rod 120 is located inboard of bracket 32 and includes a rearward lateral leg 122 projecting outboard through a slot 123 of bracket 32 and through the slots 116 and 118, with this leg being secured against inward movement relative to the slots by a clip 124. The rear lock plate 46 is biased rearwardly of the bracket 32 by a coil tension spring 126 hooked between a lanced tab of the lock plate and the flange portion 34. The front lock plate 100 is biased forwardly of the bracket 32 by a similar spring 128 hooked between a lanced tab of the the lock plate and the flange portion 34. The springs 126 and 128 respectively bias the lock plates 46 and 100 into engagement with respective pins 26 and 78 to thereby locate the lock plates in locked position and also engage the rearward end of the slot 116 and the forward end of the slot 118 with the leg 122 of rod 120. The rod 120 includes a forward lateral leg 130 which extends inboard through an apertured offset leg of a bell crank 132 pivotally mounted at 134 to the inboard side of bracket 32, FIG. 5. The other leg of the bell crank includes an integral inwardly offset rib or gear tooth 136, FIGS. 2 and 5, which receives the slotted end of a lever 138. Lever 138 is fixed to one end of a tube 140 having its outboard end pivoted at 142 to the bracket 32 and its inboard end similarly pivoted to the same bracket of the inboard adjuster. A crank rod 144 is fixed to the tube and mounts a handle 146 to provide for rotational movement of the tube 140 when the handle 146 is manually moved vertically upwardly or downwardly.

If it is desired to vertically adjust the rear portion of the seat 12, the handle 146 is manually moved clockwise or vertically upwardly as viewed in FIG. 1 to rotate the tube 140 and lever 138 clockwise about pivot 142. This in turn rotates the lever 132 counterclockwise about pivot 134 to shift the rod 120 forwardly or to the left as viewed in FIG. 2. (These directions are reversed in FIG. 5.) The leg 122 of the rod 120 will thereupon move freely forwardly within slot 116 of the front lock plate 100 as the leg moves the rear lock plate 46 forwardly against the bias of spring 126. This moves the lock plate 46 from its FIG. 1 locked position to its FIG. 3 released position to move the vertically second notch 52 of the lock plate 46 out of engagement with the pin 26. During this movement of the lock plate 46, shoes 50 slide on the flange portions 34 and 36 and pin 54 moves forwardly within the slot 56 of bracket 32 and engages the forward end thereof. When the lock plate 46 is in released position, the rear portion of bracket 32 and the seat 12 can be vertically raised or lowered by the seat passenger appropriately shifting his or her weight. If the bracket and seat are to be raised from the FIG. 3 position to the FIG. 4 position, the passenger shifts his or her weight forwardly and upwardly to permit spring 94 to rotate lever 68, tube 66 and lever 30 clockwise within opening 62 as lever 30 rotates clockwise about the pin 26. This raises bracket 32 as slot 42 moves upwardly relative to pin 26. The tube 66, lever 68 and bracket 32 move upwardly as a unit as the lever 30 pivots relative to the pin 26. Once the seat has been raised to the FIG. 4 position, the handle 46 is released whereupon the spring 126 biases the rear lock plate 46 rearwardly or to the right to move the vertically fourth notch 52 into engagement with the pin 26 and lock the rear portion of the seat in its FIG. 4 position. If the seat were to be lowered from the FIG. 4 position to the FIG. 3 position, the passenger would shift his or her weight rearwardly and downwardly once the rear lock plate is released.

The vertical downward movement of bracket 32 would be resisted by counterbalance spring 94 since the lever 68, tube 66 and lever 30 would rotate counterclockwise from their FIG. 4 position to their FIG. 3 position. During vertical adjustment of the rear portion of the seat, the seat pivots and slides about its front pivot as the pin 78 moves slightly within the slot 76 of the bracket 72.

The bracket 32 is held in each of five (5) vertical positions by the engagement of each of the five (5) notches 52 of the lock plate 46 with the pin 26. This engagement locks the bracket 32 against movement relative to the pin to bar any rotational movement of the lever 30 relative to the bracket 32 and to the pin 26. The number of notches 52 can be increased or lowered as desired.

If it is desired to vertically adjust the front portion of the seat 12, the handle 146 is manually moved downwardly or counterclockwise as viewed in FIG. 1 to in turn rotate the bell crank 132 clockwise about the pivot 134 and shift the rod 120 rearwardly as viewed in FIG. 2. This shifts the lock plate 100 rearwardly to released position as the end 122 of the rod 120 moves freely rearwardly within the slot 118 of the rear lock plate 46. When the lock plate 100 has been moved rearwardly to released position, the vertically second notch 104 of the lock plate is released from the pin 78 and the front portion of the bracket 32 and the seat 12 can thereupon be vertically adjusted by the passenger shifting his or her weight. If the front portion of the seat and bracket is to be raised, the passenger shifts his or her weight rearwardly and downwardly, and if the front portion of the seat is to be lowered, the passenger shifts his or her weight forwardly and downwardly. When the front portion of the seat and bracket is raised, counterbalance spring 94 biases the lever 92, tube 90 and lever 84 counterclockwise within opening 76 of bracket 32 as the lever 84 rotates counterclockwise about the pin 78. This raises the front portion of the seat and bracket 32 as slot 106 moves upwardly relative to pin 78. Once the seat has been moved to the desired raised position, the handle 146 is released and the spring 128 returns the lock plate 100 to locked position to engage another one of the notches 104 with the pin 78. If the front portion of the seat and bracket is vertically lowered, this action occurs against the bias of the spring 94 since the lever 92, the tube 90 and the lever 84 rotate clockwise relative to the bracket 32 as the lever 84 rotates in the same direction relative to the pin 78. During vertical adjustment of the front portion of the seat, the seat pivots about the pin 26.

From the foregoing description it can be seen that the lock plates 46 and 100 effectively lock the rear and front portions of the bracket 32 in any vertically adjusted position by interengaging with the pins 26 and 78 respectively. These pins are relatively fixed with respect to the vehicle and the lock plates are slidable and non-rotatable relative to the bracket 32. The levers 30 and 84 rotate both relative to the pins 26 and 78 and to the bracket 32. Whenever the movement of the bracket is barred by the interengagement of the lock plates with their respective pins, the levers 30 and 84 cannot rotate relative to the bracket so that the seat remains in an adjusted position. Although substantially the same adjustment has been provided for the front and rear portions of the seat, it will be apparent that a different mechanism could be provided for either the front or rear portion if desired. The handle 146 must be held during vertical adjustment of the seat in order to prevent the spring 126 or 128 from returning a respective lock plate 46 or 100 to locked position. Further, the pin and slot type connection between the leg 122 of rod 120 and the slots 116 and 118 of the lock plates 146 respectively provides for selective and alternate vertical adjustment of the front and rear portions of the seat.

If desired, the horizontal adjuster 14 could be dispensed with and the brackets 22 and 72 fixedly mounted to the vehicle. Likewise, if it is desired that only one portion of the seat be vertically adjustable, the lock plate and levers corresponding to the other portion of the seat can be dispensed with and the other portion of the seat can be pivotally mounted directly to either the pin 26 or the pin 78.

Thus this invention provides an improved vertical seat adjuster for vehicle seats.

The embodiments of the invention in which an exclusive property or privilege is claimed are defined as follows:

1. A seat support mechanism for mounting a vehicle seat on a vehicle for vertical adjustment thereof relative to the vehicle comprising, in combination,
   an elongate seat support for supporting the seat and including a generally vertically directed slot in a first portion thereof,
   spaced first and second pivot means mounted on the vehicle, the first pivot means extending through the slot of the seat support,
   a lever having one end thereof rotatably secured to the first portion of the seat support and the other end thereof rotatably secured to the first pivot means,
   means pivotally mounting a second portion of the seat support to the second pivot means,
   rotation of the lever about the first pivot means causing the first portion of the seat support and lever to rotate relative to each other to vertically adjust the first portion of the seat support as the slot of the seat support moves vertically relative to the first pivot means and the second portion of the seat support rotates relative to the second pivot means,
   a lock plate including a series of detent means, each detent means representing a vertical position of the seat support relative to the first pivot means and being selectively engageable with the first pivot means to lock the seat support in such position,
   cooperating means on the lock plate and the seat support mounting the lock plate on the seat support for movement therewith and sliding movement relative thereto between
   (1) a locked position wherein one detent means of the lock plate engages the first pivot means to lock the seat support in the vertical position represented by the one detent means by blocking relative rotational movement between the seat support and lever, and
   (2) a released position wherein the one detent means of the lock plate is disengaged from the first pivot means to permit relative rotational movement between the seat support and lever as the seat support moves to a different vertical position relative to the first pivot means, return of the lock plate to locked position engaging another detent means of the lock plate with the first pivot means to lock the seat support in the vertical position represented by such detent means, means biasing the lock plate to locked position, and, release means for moving the lock plate to released position.

2. A seat support mechanism for mounting a vehicle seat on a vehicle for vertical adjustment thereof relative to the vehicle comprising, in combination,
an elongate seat support for supporting the seat and including a generally vertically directed slot generated on an arc in a first portion thereof,
spaced first and second pivot means mounted on the vehicle, the first pivot means including a pivot member extending through the slot of the seat support,
a lever having one end thereof rotatably secured to the first portion of the seat support and the other end thereof rotatably secured to the pivot member,
means pivotally mounting a second portion of the seat support to the second pivot means,
rotation of the lever about the first pivot means causing the first portion of the seat support and lever to rotate relative to each other to vertically adjust the first portion of the seat support as the slot of the seat support moves vertically relative to the pivot member and the second portion of the seat support rotates relative to the second pivot means,
a lock plate including a series of detent means arranged along an arc matching the arc of the slot, each detent means representing a vertical position of the seat support relative to the pivot member and being selectively engageable with the pivot member to lock the seat support in such position,
cooperating means on the lock plate and the seat support mounting the lock plate on the seat support for movement therewith and sliding movement relative thereto between
(1) a locked position wherein one detent means of the lock plate engages the pivot member to lock the seat support in the vertical position represented by the one detent means by blocking relative rotational movement between the seat support and lever, and
(2) a released position wherein the one detent means of the lock plate is disengaged from the pivot member to permit relative rotational movement between the seat support and lever as the seat support moves to a different vertical position relative to the pivot member, return of the lock plate to locked position engaging another detent means of the lock plate with the pivot member to lock the seat support in the vertical position represented by such detent means,
means biasing the lock plate to locked position, and, release means for moving the lock plate to released position.

3. A seat support mechanism for mounting a vehicle seat on a vehicle for vertical adjustment thereof relative to the vehicle comprising, in combination,
an elongate seat support for supporting the seat and including a generally vertically directed closed slot generated on an arc through a first portion thereof,
spaced first and second pivot means mounted on the vehicle, the first pivot means including a pivot member extending through the slot of the seat support,
a lever having one end thereof rotatably secured to the first portion of the seat support and the other end thereof rotatably secured to the pivot member,
means pivotally mounting a second portion of the seat support to the second pivot means,
rotation of the lever about the pivot member causing the first portion of the seat support and lever to rotate relative to each other to vertically adjust the first portion of the seat support as the slot of the seat support moves vertically relative to the pivot member and the second portion of the seat support rotates relative to the second pivot means,
a lock plate including a series of detent means arranged along an arc matching the arc of the slot, each detent means representing a vertical position of the seat support relative to the pivot member and being selectively engageable with the pivot member to lock the seat support in such position,
linear guide means on the first portion of the seat support to each end of the slot,
guided means on the lock plate cooperable with the guide means to mount the lock plate on the seat support for movement therewith and sliding movement relative thereto between
(1) a locked position wherein one detent means of the lock plate engages the pivot member to lock the seat support in the vertical position represented by the one detent means by blocking relative rotational movement between the seat support and lever, and
(2) a released position wherein the one detent means of the lock plate is disengaged from the pivot member to permit relative rotational movement between the seat support and lever as the seat support moves to a different vertical position relative to the pivot member, return of the lock plate to locked position engaging another detent means of the lock plate with the pivot member to lock the seat support in the vertical position represented by such detent means,
means biasing the lock plate to locked position, and release means for moving the lock plate to released position.

4. A seat support mechanism for mounting a vehicle seat on a vehicle for vertical adjustment thereof relative to the vehicle comprising, in combination,
an elongate generally planar seat support for supporting the seat and including a generally vertically directed closed arcuate slot extending through a first portion thereof, said slot being generated on an arc and the ends thereof being bounded by linear flanges of the seat support,
spaced first and second pivot means mounted on the vehicle, the first pivot means extending through the slot of the seat support,
a lever having one end thereof rotatably secured to the first portion of the seat support and the other end thereof rotatably secured to the first pivot means,
means pivotally mounting a second portion of the seat support to the second pivot means,
rotation of the lever about the first pivot means causing the first portion of the seat support and lever to rotate relative to each other to vertically adjust the first portion of the seat support as the slot of the seat support moves vertically relative to the first pivot means and the second portion of the seat support rotates relative to the second pivot means,
a lock plate extending between the linear flanges of the seat support and located between the lever and seat support, said lock plate including a series of detent means arranged along an arc matching the arc of the slot, each detent means representing a vertical position of the seat support relative to the first pivot means and being selectively engageable with the pivot means to lock the seat support in such position, anti-friction means on the lock plate engaging the seat support flanges to mount the lock plate on the seat support for movement therewith and linear horizontal sliding movement relative thereto between (1) a locked position wherein one detent means of the lock plate engages the first pivot means to lock the seat support in the vertical position represented by the one detent means by blocking relative rotational movement between the seat support and lever, and (2) a released position wherein the one detent means of the lock plate is disengaged from the first pivot means to permit relative rotational movement between the seat support and lever as the seat support moves to a different vertical position relative to the first pivot means, return of the lock plate to locked position engaging another detent means of the lock plate with the first pivot means to lock the seat support in the vertical position represented by such detent means, means biasing the lock plate to locked position, and release means for moving the lock plate to released position.

5. A seat support mechanism for mounting a vehicle seat on a vehicle for vertical adjustment thereof relative to the vehicle comprising, in combination, an elongate seat support for supporting the seat and including a planar portion having spaced generally horizontally extending flanges and a generally vertically directed arcuate closed slot located between said flanges, spaced first and second pivot means mounted on the vehicle, the first pivot means including a pivot pin extending through the slot of the seat support, a lever having a lateral extension on one end thereof rotatably journalled in the first portion of the seat support and the other end thereof rotatably secured to the pivot pin, means pivotally mounting a second portion of the seat support to the second pivot means, rotation of the lever about the pivot pin causing the seat support and lever extension to rotate relative to each other to vertically adjust the first portion of the seat support as the slot of the seat support moves vertically relative to the pivot pin and the second portion of the seat support rotates relative to the second pivot means, a planar lock plate extending between the seat support flanges intermediate the lever and the planar seat support portion, said lock plate including a series of detent notches arranged along an arc matching the arc of the slot, each detent notch representing a vertical position of the seat support relative to the pivot pin and being selectively engageable with the pivot pin to lock the seat support in such position, anti-friction plastic shoes on the lock plate engageable with the seat support flanges to slidably mount the lock plate on the seat support for movement therewith and sliding movement relative thereto between (1) a locked position wherein one detent notch of the lock plate engages the pivot pin to lock the seat support in the vertical position represented by the one detent notch by blocking relative rotational movement between the seat support and lever, and (2) a released position wherein the one detent notch of the lock plate is disengaged from the pivot pin to permit relative rotational movement between the seat support and lever as the seat support moves to a different vertical position relative to the pivot pin, return of the lock plate to locked position engaging another detent notch of the lock plate with the pivot pin to lock the seat support in the vertical position represented by such detent notch, means biasing the lock plate to locked position, release means for moving the lock plate to released position, and means connected to the lever extension to assist rotation of the lever relative to the seat support in a direction to vertically raise the first portion of the seat support.

* * * * *